Sept. 1, 1936.  B. G. CARLSON ET AL  2,052,866
PILOT DIRECTING GYROSCOPE
Filed Nov. 12, 1932  3 Sheets-Sheet 2
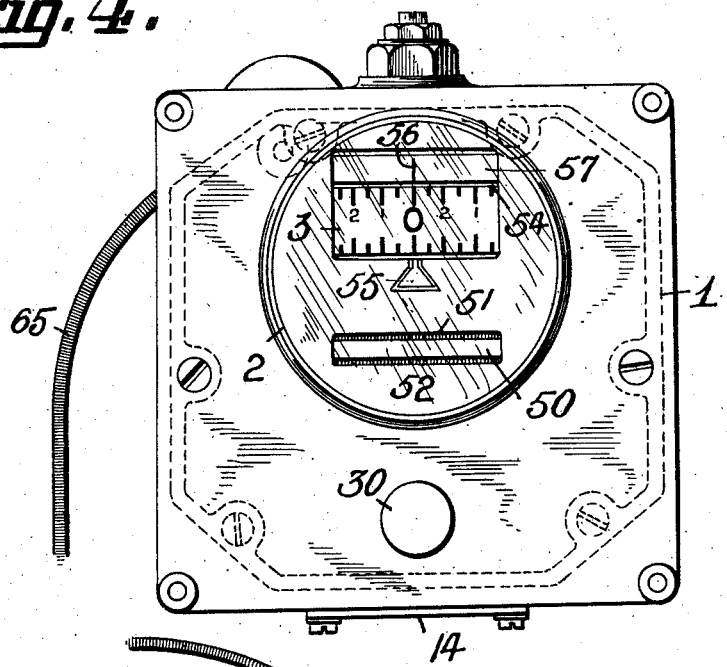
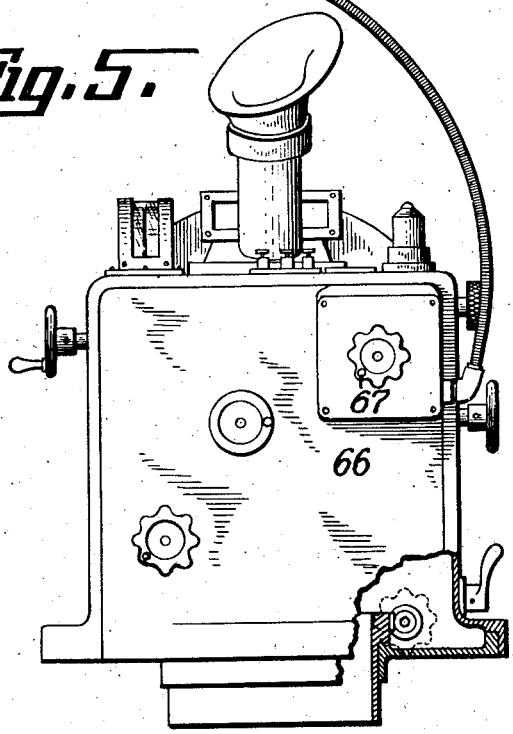
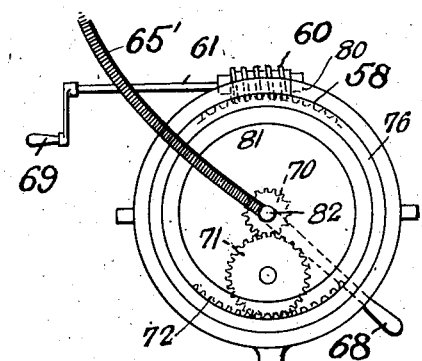
INVENTORS:
Bert G. Carlson
Leslie F. Carter.
BY
Herbert H. Thompson
ATTORNEY.

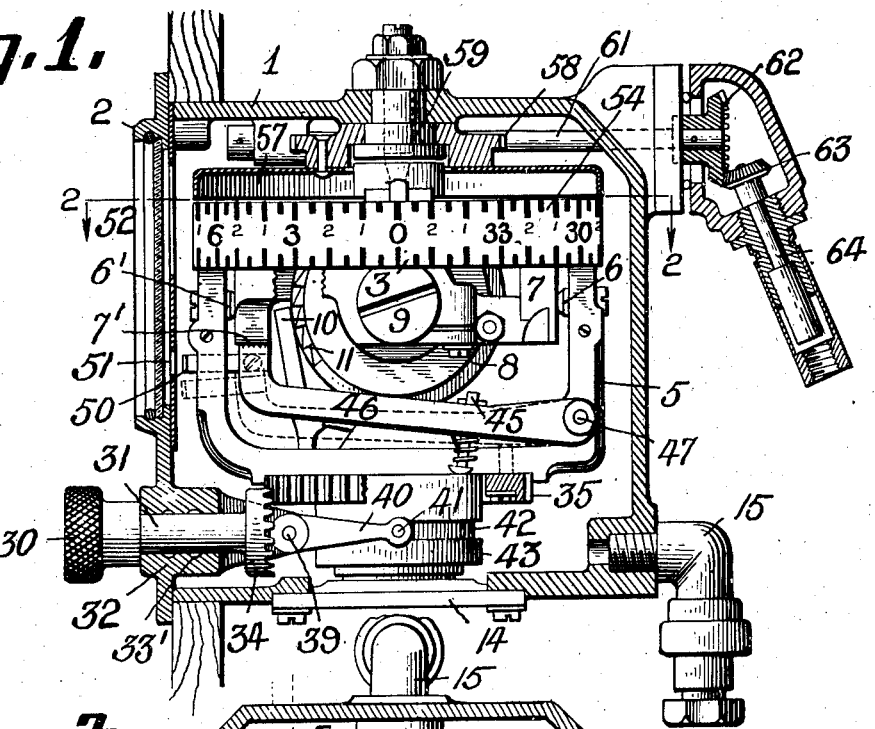

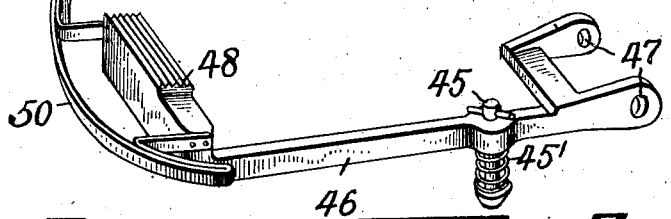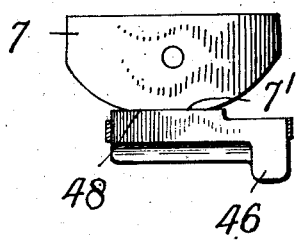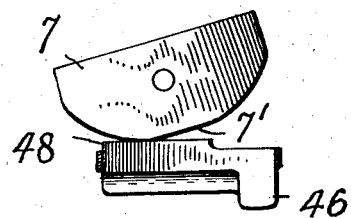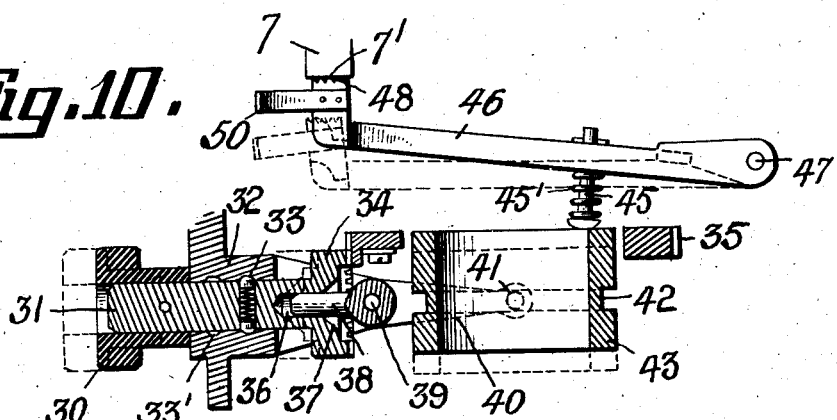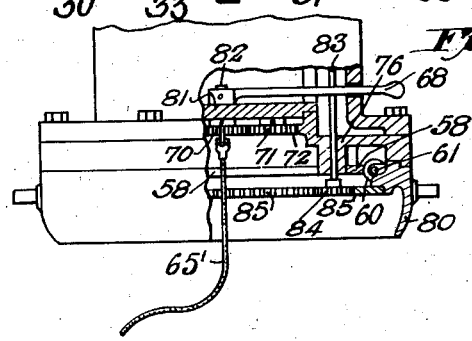

Patented Sept. 1, 1936

2,052,866

UNITED STATES PATENT OFFICE 2,052,866

PILOT DIRECTING GYROSCOPE

Bert G. Carlson, Queens Village, N. Y., and Leslie F. Carter, Leonia, N. J., assignors to Sperry Gyroscope Company, Inc., Brooklyn, N. Y., a corporation of New York Application November 12, 1932, Serial No. 642,360

4 Claims. (Cl. 33—204)

This invention relates to directional gyroscopes for aircraft which may or may not be used as a part of a pilot directing system. One object of the invention is to improve the construction of the locking or caging devices employed on such gyroscopes so as to avoid damage to the gyroscope during the caging operation. Another object is to provide a simple indicating means for showing the aviator whether or not the gyroscope is running at the proper speed so that the aviator may be warned not to use the instrument when it is not operating properly. Another object of the invention is to improve the accuracy of the caging device so that when the gyroscope is released it will not be disturbed by the releasing operation and will remain in the set position. A further object of the invention is to provide a movable index on the gyroscope adapted to be controlled from a bomb sight or other point of observation so that the pilot may maintain the craft on the course desired by the bomber by simply maintaining the reading of the directional gyroscope a constant.

Referring to the drawings showing one form our invention may assume,

Fig. 1 is a vertical section through the casing of one of our directional gyroscopes.

Fig. 2 is a horizontal section of the same taken approximately on line 2—2 of Fig. 1.

Fig. 3 is a plan view of the top of the lock or caging bar.

Fig. 4 is a face view of our directional gyroscope or pilot director.

Fig. 5 is a face view of a bomb sight showing the connection therefrom to the pilot director, the former being drawn to a much smaller scale than the latter.

Fig. 6 shows a modified form of bomb sight mounting in which the movements of the bomb sight itself control the index on the pilot director.

Fig. 7 is a perspective view of the locking or caging bar of the gyroscope.

Figs. 8 and 9 are end views of the locking bar when engaging the frame of the gyroscope, Fig. 9 showing the action of the gyroscope in depressing the bar when being tested by the pilot.

Fig. 10 is a side elevation of the locking bar and operating mechanism therefor showing the bar in both the caging and uncaged positions.

Fig. 11 is a side elevation, partly in section, of the lower portion of the form of bomb sight shown in Fig. 6.

The gyroscope itself may be of a form similar to that shown in the prior application of Bert G. Carlson, one of the joint inventors, Serial No. 608,189 for Constrained directional gyroscopes, filed April 29, 1932, but it will be understood that our invention is applicable to other types. As shown, the instrument comprises an outer casing or housing 1 for supporting and enclosing the gyroscope, said housing being provided with a front window 2 through which the indicator or compass card 3 on the gyroscope may be read. Within said casing there is journaled on vertical bearings a vertical ring 5, and within said ring there is supported on horizontal trunnions 6, 6' a rotor bearing frame or ring 7. The rotor 8 is shown as journaled for rotation within said ring on normally horizontal rotor bearings 9. The rotor is preferably driven by an air jet or jets from a nozzle or nozzles in tube 10, the streams of air striking pockets 11 cut in the periphery of the rotor. Air may be supplied to the jets through a screened aperture located in the bottom plate 14 which carries the lower vertical bearing for the vertical ring 5 as shown in the said prior application, air being continuously withdrawn from the casing through pipe 15.

Such gyroscopes are usually provided with a setting means whereby they may be set on any desired course or corrected from time to time by the magnetic compass. Our improved setting means is shown as a thumb piece 30 fixed to a short shaft 31 slidably and rotatably mounted in gland 32. Said shaft is provided with spring-pressed blocks 33 so that it may be yieldingly held either in its inner or outer positions by their engagement in annular recesses 33'. At its inner end said shaft is provided with a crowned gear 34 which, when said shaft is pushed inwardly as far as it will go, meshes with an annular spur gear 35 secured to the base of the vertical ring 5 whereby the gyroscope may be set by turning the knob 30. Means are also provided to lock or centralize the gyroscope about its horizontal axis at this time to prevent precession. Preferably such means should operate before gears 34 and 35 are brought into mesh and be released after said gears are released to avoid damage to the gears and disturbance of the gyroscope. To this end shaft 31 has its inner end provided with a bore 36 having a flaring mouth 37. When pushed inwardly, the walls of said mouth engage a finger 38 secured to shaft 39 thus centralizing the finger upon initial movement of shaft 31, the further inward movement merely causing said finger to enter bore 36. Also secured to said shaft 39 is a fork 40 (Figs. 1 and 10), the outer ends of which are provided with pins 41 to engage an annular groove 42 in an outer vertically slidable sleeve 43. Normally said sleeve rests in its lowermost position but when shaft 31 is first pushed inwardly, the pin 38 rotates the shaft 39 to raise the forked lever 40, thus raising sleeve 43 to the position shown in Figs. 1 and 10.

On top of said sleeve rests a pin 45 preferably slidably mounted in a locking lever 46 pivoted at 47. Preferably said pin is yieldingly pressed downwardly by the spring 45' so that the locking member 46 is resiliently supported on top of the sleeve 43. The outer end of lever 46 is turned inwardly and upwardly to form a flattened seat 48, which engages the flattened underside 7' of the rotor bearing ring 7 when the gyro is in the locked position. In prior constructions, the pin 45 was rigidly mounted in the lever which gave rise to excessive torques at times on the gyro bearings during caging operation. Also, it had been the prior practice to leave a slight gap between the caging arm and the co-acting surface 7' on the gimbal ring to overcome mechanical inaccuracies in manufacture which caused the caging arm to bear too heavily on the gimbal ring at certain headings and not sufficiently on others. It was, therefore, the prior practice to adjust the arm so that the surface 48 cleared the surface 7' on all headings a slight amount with the attending loss of accuracy in caging. With the spring construction, however, this play may be entirely eliminated, and at the same time excessive torques on the bearings avoided because the spring will yield to permit slight precession under full pressure. The spring is preferably designed with sufficient stiffness to completely overcome the gyro precession and restore the latter to horizontal when the setting knob 30 is not being rotated but is designed to yield slightly in case full precessional forces are set up during turning of the knob 30. By using the spring also the gyroscope may be completely and accurately positioned on any heading so that when it is released the gyroscope will remain in the set position, whereas in the prior system the gyro might be released with a slight inclination which would introduce error by reason of the torque set up by the erecting action of the spinning jets as explained in the above referred to joint application. The spring is also made stiff so that it will not yield when the knob 30 is turned unless the gyroscope is up to the proper speed, in which case the precessional forces are sufficient to press the locking foot 48 downwardly as shown in Fig. 9.

This phenomenon we make use of to furnish an indication to the aviator of whether the gyroscope is operating properly so that he may be warned not to rely on the instrument unless it is rotating at proper speed. For instance, excessive cold sometimes causes the rotor bearings to stick due to unequal contraction of the parts, or ice or dirt may have clogged the Venturi tube used to exhaust the casing 1. This indicator may be in the form of a flat strip 50 secured to the foot 48 and projecting forward therefrom so as to be visible through a slot 51 in the face or cover 52 of the instrument. If the pilot desire to see whether the gyroscope is operating properly, he merely pushes in the knob 30 and turns it slightly. If the bar 51 disappears temporarily, he knows that the instrument is operating, otherwise that it is not spinning at the proper speed or guide and horizontal bearings are not free.

Around the top of the vertical ring we mount the compass card 3, which, in this instance, is provided with graduations both at the top and at the bottom. The bottom graduations are designed to be read upon a stationary index 55 on the face, while the top graduations 54 are readable against an index 56 on a ring 57 rotatably mounted above the compass card 3. Said ring is shown as adjustable from a distance so that it may be set by the navigator or bomb sight operator in another part of the aircraft. As shown, said ring is secured to a worm gear 58 journaled in the bearing 59 at the top of the gyroscope and adjustable by means of a worm 60 mounted on the shaft 61. Said shaft is turned by bevel gear 62 thereon meshing with a bevel gear 63 on a shaft 64, said shaft being designed to be coupled to a flexible shaft 65 leading to the navigator's compartment. As shown in Fig. 5, the shaft leads to the bomb sight 66, the bomb sight operator turning the handle 67 in one direction or the other as a change in course is desired. All the pilot need do, therefore, to keep on the desired course is to bring the plane around so that a given indication, say zero, on the card 3 remains opposite the index 56 on ring 57. In case the bomb sight is of the type disclosed in Fig. 11 of the joint application of E. W. Chafee and H. Murtagh, Serial No. 618,080 filed June 18, 1932 for Bomb sights, turning a part of the bomb sight through handle 68 (Fig. 6) may be made to turn directly the index 56 through the shaft 65'. According to this construction, the outer binnacle ring 80 has journalled thereon a ring or platform 76 which is turned on the binnacle by means of the worm 60 on shaft 61 from a handle 69. This platform, in turn, is provided with internal gear teeth 72 and on said platform is rotatably mounted an inner plate 81 which carries the optics of the bomb sight. Said platform may be revolved by means of a handle 68 which is shown as secured to a shaft 82, on which is mounted a pinion 70 and to which is secured the flexible shaft 65', which leads to the pilot directing gyroscope of Fig. 4. Pinion 70, in turn, meshes with an idler 71 journalled on platform 81, the idler, in turn, meshing with the internal gear 72. It will be readily apparent, therefore, that the turning of the handle 68 will revolve the platform 81 within the part 76 and also that when the part 76 is revolved by means of worm 60, the platform 81 will likewise be revolved. When, however, the part 76 alone is revolved, it rotates a shaft 83 by means of a pinion 84 thereon meshing with an internal annulus 85, for the purpose of setting in the drift angle in the bomb sight. Turning of the bomb sight, therefore, from the handle 69 sets in the drift angle, but does not turn the index 56 on the directional gyroscope. In approaching the target, the bomber first turns the sight through the handle 69, which does not turn shaft 65' but does turn the shaft 83 which sets in the proper drift angle as the sight is turned parallel to the ground course. As soon as the straight ground track of the target is set up, the drift angle is established. He then brings the sight around to bear on the target by means of the handle 69, thus signalling the pilot to turn, but which does not affect the properly set up drift angle. The pilot then continues to use the directional gyroscope as his compass in approaching the target.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a directional gyroscope having freedom about vertical and horizontal axes, means for simultaneously locking the same about said horizontal axis and setting it about said vertical axis including a movable locking member adapted to engage and centralize the gyroscope about its horizontal axis, means for setting the gyroscope while so locked about its vertical axis, a spring means for supporting said locking means adapted to permit temporary yielding thereof during a setting operation due to precession if the gyroscope is running, and an indicator secured to said locking member and viewable at the face of the instrument for showing by its movement due to precession of the gyroscope against said spring means when locked, whether the gyroscope is spinning.

2. In a device of the character described, a casing, a gyroscope having a vertical ring and mounted therein with three degrees of freedom for relative movement about a vertical axis through a complete revolution, an annular gear carried by said ring, a pinion normally out of engagement with said gear but operable axially into engagement therewith, means for rotating said pinion to change the relationship of said gyroscope to said casing, a sleeve, means for raising said sleeve by axial movement of said pinion, a locking lever pivoted on said ring and having operative engagement with said sleeve for engaging and locking the gyroscope about its horizontal axis, a yielding connection between said lever and sleeve, whereby limited precessional movement of said gyroscope is permitted when being reset, and an indicator secured to said locking member and viewable at the face of the instrument for showing by its movement due to precession of the gyroscope against said spring means when locked, whether the gyroscope is spinning.

3. In a directional gyroscope having freedom about vertical and horizontal axes, means for simultaneously locking the same about said horizontal axis and setting it about said vertical axis including a movable locking member adapted to engage and centralize the gyroscope about its horizontal axis, means for setting the gyroscope while so locked about its vertical axis, a compass card mounted on and rotatable in azimuth with said gyroscope, a fixed index on which said card is normally read, a movable index also readable on said card, and means operable from a distance for setting said movable index to show the desired course changes.

4. In a pilot directing system for bombing aircraft, the combination with a bomb sight and directional gyroscope, of means for turning the bomb sight in azimuth for setting up the drift angle, separate means for turning the sight on the target after said drift angle has been set up, a movable index on said gyroscope, and means operable by the turning of said sight from the second of said means only for shifting said index through a corresponding angle.

BERT G. CARLSON.
LESLIE F. CARTER.